(12) United States Patent
Chuo et al.

(10) Patent No.: US 11,708,876 B2
(45) Date of Patent: Jul. 25, 2023

(54) PUSHING FORCE-ACTUATED BRAKING DEVICE AND ROTARY TABLE USING THE SAME

(71) Applicant: HIWIN TECHNOLOGIES CORP., Taichung (TW)

(72) Inventors: Wen-Hen Chuo, Taichung (TW); Yaw-Zen Chang, Taichung (TW); Yu-Jung Chang, Taichung (TW); Jyun-Lin Li, Taichung (TW); Li-Wen Huang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 172 days.

(21) Appl. No.: 17/316,996

(22) Filed: May 11, 2021

(65) Prior Publication Data

US 2022/0145952 A1    May 12, 2022

(30) Foreign Application Priority Data

Nov. 10, 2020   (TW) ................................. 109139153

(51) Int. Cl.
*F16D 65/22* (2006.01)
*F16D 65/18* (2006.01)
(Continued)

(52) U.S. Cl.
CPC .......... *F16D 65/18* (2013.01); *F16D 2121/02* (2013.01); *F16D 2125/06* (2013.01)

(58) Field of Classification Search
CPC ...... F16D 59/02; F16D 65/18; F16D 2121/02; F16D 2121/06; F16D 2121/12;
(Continued)

(56) References Cited

U.S. PATENT DOCUMENTS 4,279,330 A * 7/1981 Pottorff ................... F16D 59/02
188/170
6,260,668 B1 * 7/2001 McClanahan ....... F16D 25/0638
188/71.6
(Continued)

FOREIGN PATENT DOCUMENTS

CN    210024594 U    2/2020
TW    M359398 U      6/2009

*Primary Examiner* — Nicholas J Lane
(74) *Attorney, Agent, or Firm* — Muncy, Geissler, Olds & Lowe, P.C.

(57) ABSTRACT

A pushing force-actuated braking device includes an annular housing that houses a brake disc, a braking piston, plural braking elements, and a brake-releasing piston. When only the braking piston is under the action of a fluid, the braking piston applies an axial pushing force to the brake disc such that the brake disc is kept at a braking position jointly by the braking piston and the braking elements. When only the brake-releasing piston is under the action of a fluid, the brake-releasing piston applies an opposite pushing force to the brake disc to keep it at a brake-releasing position. Should the fluid acting on the braking piston fail, the force of the braking elements still enables the brake disc to produce a braking effect. The pushing force-actuated braking device has a modular design to facilitate assembly and disassembly. A rotary table using the braking device is also provided.

11 Claims, 14 Drawing Sheets

(51) Int. Cl.
*F16D 125/06* (2012.01)
*F16D 121/02* (2012.01)

(58) Field of Classification Search
CPC ............. F16D 2123/00; F16D 2125/06; B23Q 11/0092; B23Q 2705/005; B23Q 16/105
See application file for complete search history.

(56) References Cited

U.S. PATENT DOCUMENTS

| | | | | |
|---|---|---|---|---|
| 6,405,837 | B1* | 6/2002 | Muramoto | F16D 65/186 188/170 |
| 6,561,943 | B1* | 5/2003 | Bae | F16D 27/115 475/320 |
| 7,258,208 | B1* | 8/2007 | Dennis | F16D 55/36 188/170 |
| 7,909,147 | B1* | 3/2011 | Schnell | F16D 65/853 188/264 D |
| 9,239,088 | B2* | 1/2016 | Roehling | F16D 65/092 |
| 10,029,339 | B2* | 7/2018 | Nishimura | B23Q 16/105 |
| 10,427,265 | B2* | 10/2019 | Tachiki | B23Q 16/105 |
| 2011/0000750 | A1* | 1/2011 | Schnell | F16D 65/853 188/71.6 |
| 2015/0360337 | A1* | 12/2015 | Nishimura | B23Q 11/0092 269/57 |
| 2019/0070704 | A1* | 3/2019 | Xia | B23Q 16/105 |

* cited by examiner

US 11,708,876 B2

PUSHING FORCE-ACTUATED BRAKING DEVICE AND ROTARY TABLE USING THE SAME

BACKGROUND OF THE INVENTION

1. Technical Field

The present invention relates to a braking device and more particularly to a pushing force-actuated braking device and a rotary table using the same.

2. Description of Related Art

The headstock of a lathe is generally equipped with a braking device for applying a braking force to the spindle of the headstock while the spindle is in a stationary state, the objective being to stabilize the spindle in the stationary state and prevent the spindle from rotating after a machining operation ends. A conventional braking device, however, is unable to apply a braking force to a spindle in special circumstances, e.g., when a power outage takes place without notice or when a pipe conveying the braking device-actuating fluid breaks. Should the braking device of a rotary table fail, not only is the headstock likely to be damaged, but also people close to the headstock may be injured.

CN Patent No. 210024594 U discloses a normally closed hydraulic braking device. When a machine equipped with the braking device is shut down or in a standby state, the piston in the braking device is driven downward by the elastic force of a plurality of springs such that the braking device is in an engaging state and locks the spindle of the machine against rotation. The piston can be pushed in the opposite direction with a hydraulic oil to release the braking device and thereby allow normal operation of the spindle. In this patent, however, the entire device lacks a modular design, so the components must be put together individually, which causes inconveniences in maintenance and adjustment. Moreover, the braking force provided by the plurality of springs is too weak to be suitable for a relatively large spindle.

TW Patent No. M359398 discloses an index plate with a braking system. The shaft of the pneumatic cylinder in the system can push the hydraulic oil in an oil chamber so that the hydraulic oil enters the gap between a piston disc bottom plate and a piston disc through the corresponding oil passages, thereby pushing, i.e., causing axial displacement of, the piston disc and a large brake disc in order for the frictional contact between the large brake disc and a small brake disc to prevent a spindle, and hence the faceplate coupled thereto, from rotating. Conversely, when the shaft of the pneumatic cylinder is retracted, the large brake disc is separated from the small brake disc by a plurality of elastic elements pressing against the front end face of the piston disc; as a result, the spindle and the faceplate can be rotated again. In this patent, however, the entire device lacks a modular design too, so the components must also be put together individually, which causes inconveniences in maintenance and adjustment. Moreover, while the elastic restoring force of the plurality of elastic elements is used to disengage the large brake disc from the small brake disc to produce a brake-releasing effect, the elastic elements may experience elastic fatigue after use for a certain amount of time and therefore fail to separate the large brake disc from the small brake disc completely. If the two brake discs remain in contact with each other partially, they will be worn by each other.

BRIEF SUMMARY OF THE INVENTION

The primary objective of the present invention is to provide a pushing force-actuated braking device that has a normally closed braking mechanism to enhance operational safety, and that has the advantages of a modular design.

To achieve the primary objective stated above, the present invention provides a pushing force-actuated braking device that includes an annular housing, a brake disc, a braking piston, a brake-releasing piston, and a plurality of braking elements. The brake disc is provided in the annular housing, can be moved between a braking position and a brake-releasing position, and has a first surface and a second surface facing away from the first surface. The braking piston is provided in the annular housing, abuts against the first surface of the brake disc, and can apply a first axial pushing force to the brake disc when subjected to the action of a first fluid. The brake-releasing piston is provided in the annular housing, is adjacent to the second surface of the brake disc, and can apply a second axial pushing force to the brake disc when subjected to the action of a second fluid. The braking elements are provided in the annular housing, are located on the same side of the brake disc as the braking piston, and apply a third axial pushing force to the brake disc constantly.

It can be known from the above that when the braking piston is not subjected to the action of the first fluid and the brake-releasing piston is not subjected to the action of the second fluid either, the brake disc is kept at the braking position by the third axial pushing force applied by the braking elements to the brake disc; that when the braking piston is subjected to the action of the first fluid but the brake-releasing piston is not subjected to the action of the second fluid, the brake disc is kept at the braking position jointly by the first axial pushing force applied by the braking piston to the brake disc and the third axial pushing force applied by the braking elements to the brake disc; and that when the braking piston is not subjected to the action of the first fluid but the brake-releasing piston is subjected to the action of the second fluid, the second axial pushing force applied by the brake-releasing piston to the brake disc overcomes the third axial pushing force applied by the braking elements to the brake disc and thereby keeps the brake disc at the brake-releasing position. In other words, the braking piston and the brake-releasing piston of the pushing force-actuated braking device are so designed that simply by guiding the first fluid to the braking piston and the second fluid to the brake-releasing piston, the brake disc will be driven to produce a braking effect and a brake-releasing effect effectively. Should the braking piston fail, the design of the braking elements still allows the brake disc to stay at the braking position. Thus, a normally closed braking mechanism is achieved to enhance operational safety.

Preferably, the first surface of the brake disc has a positioning protruding portion, and the side of the braking piston that faces the brake disc has a positioning recessed portion. The positioning protruding portion of the brake disc is fitted in the positioning recessed portion of the braking piston to secure the brake disc in position.

Preferably, the annular housing has a first housing portion and a second housing portion provided at the first housing portion. The braking piston and the braking elements are provided in the first housing portion. The brake-releasing piston is provided in the second housing portion. The brake disc is provided between the first housing portion and the second housing portion.

Preferably, the first housing portion has a first annular groove, where the braking piston is provided, and a first fluid input hole in communication with the first annular groove. The first fluid applies a force to the braking piston after reaching the first annular groove from the first fluid input hole. The second housing portion has a second annular groove, where the brake-releasing piston is provided, and a second fluid input hole in communication with the second annular groove. The second fluid applies a force to the brake-releasing piston after reaching the second annular groove from the second fluid input hole.

Preferably, the side of the first housing portion that faces the second housing portion further has a plurality of first receiving holes surrounding the first annular groove, the first surface of the brake disc has a plurality of second receiving holes, and each braking element is provided between a corresponding pair of first and second receiving holes.

Preferably, each braking element is a compression spring or is composed of a first magnet and a second magnet. In the former case, the elastic force generated by each braking element constitutes the third axial pushing force. In the latter case, the corresponding ends of each first magnet and second magnet have the same polarities, and the magnetic repulsive force generated between each corresponding pair of first and second magnets constitutes the third axial pushing force.

The present invention also provides a rotary table using the pushing force-actuated braking device described above. The rotary table includes a case, a rotating shaft, and a working disc. The rotating shaft extends through the case in a rotatable manner. The front end of the rotating shaft is connected to the working disc and has an outer peripheral surface having a protruding annular portion. The pushing force-actuated braking device is locked to the case via the annular housing and is penetrated by the front end of the rotating shaft. When at the braking position, the brake disc is pushed against the protruding annular portion of the rotating shaft and thereby produces a braking effect on the rotating shaft. When at the brake-releasing position, the brake disc is spaced apart from the protruding annular portion of the rotating shaft, with a gap formed between the brake disc and the protruding annular portion.

It can be known from the above that the pushing force-actuated braking device of the present invention has a modular design, need not be fixed to the rotating shaft, and therefore provides convenience of assembly. In addition, the entire pushing force-actuated braking device can be detached from the case with ease in order to be adjusted or serviced.

Preferably, a braking plate is locked to the protruding annular portion of the rotating shaft, and the inner periphery of the brake disc has a braking portion. The braking portion of the brake disc is pushed against the braking plate when the brake disc is at the braking position.

Preferably, the brake disc is kept at the brake-releasing position by a fourth axial pushing force while the annular housing is being mounted to the case, lest the contact surfaces of the brake disc and of the case collide and cause damage to each other.

Preferably, the rotating shaft is provided therein with a gas channel, and while the annular housing is mounted to the case, a gas is injected into the gas channel in order for the gas to apply the fourth axial pushing force to the brake disc.

The structural details, features, and assembly or use methods of the pushing force-actuated braking device provided by the present invention and of the rotary table using the same will be described below with reference to some illustrative embodiments. As would be understood by a person of ordinary skill in the art, the following detailed description and the specific embodiments disclosed herein serve only to expound the invention but not to limit the scope of the invention.

DETAILED DESCRIPTION OF THE INVENTION

Figure 1:
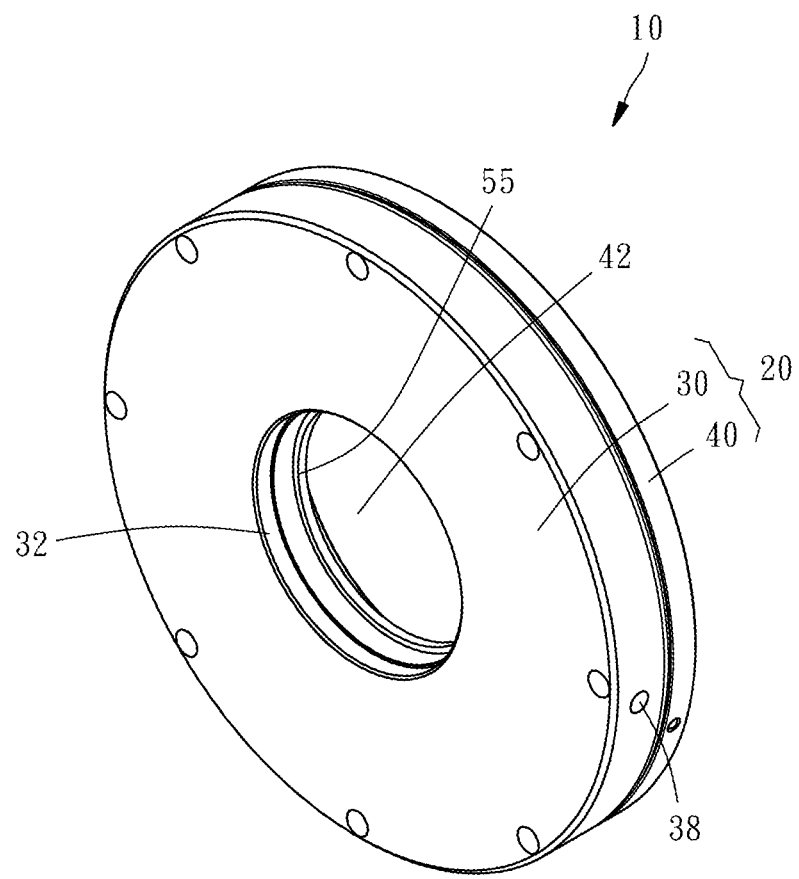
FIG. 1 is a perspective view of the pushing force-actuated braking device according to the first embodiment of the present invention.

To begin with, the applicant wishes to point out that, throughout this specification (including the following description of some illustrative embodiments of the present invention) and the appended claims, all the directional terms make reference to the directions presented in the accompanying drawings. Moreover, in the following embodiments and the drawings, the same or similar elements or structural features are indicated by the same reference numeral.

Figure 2:
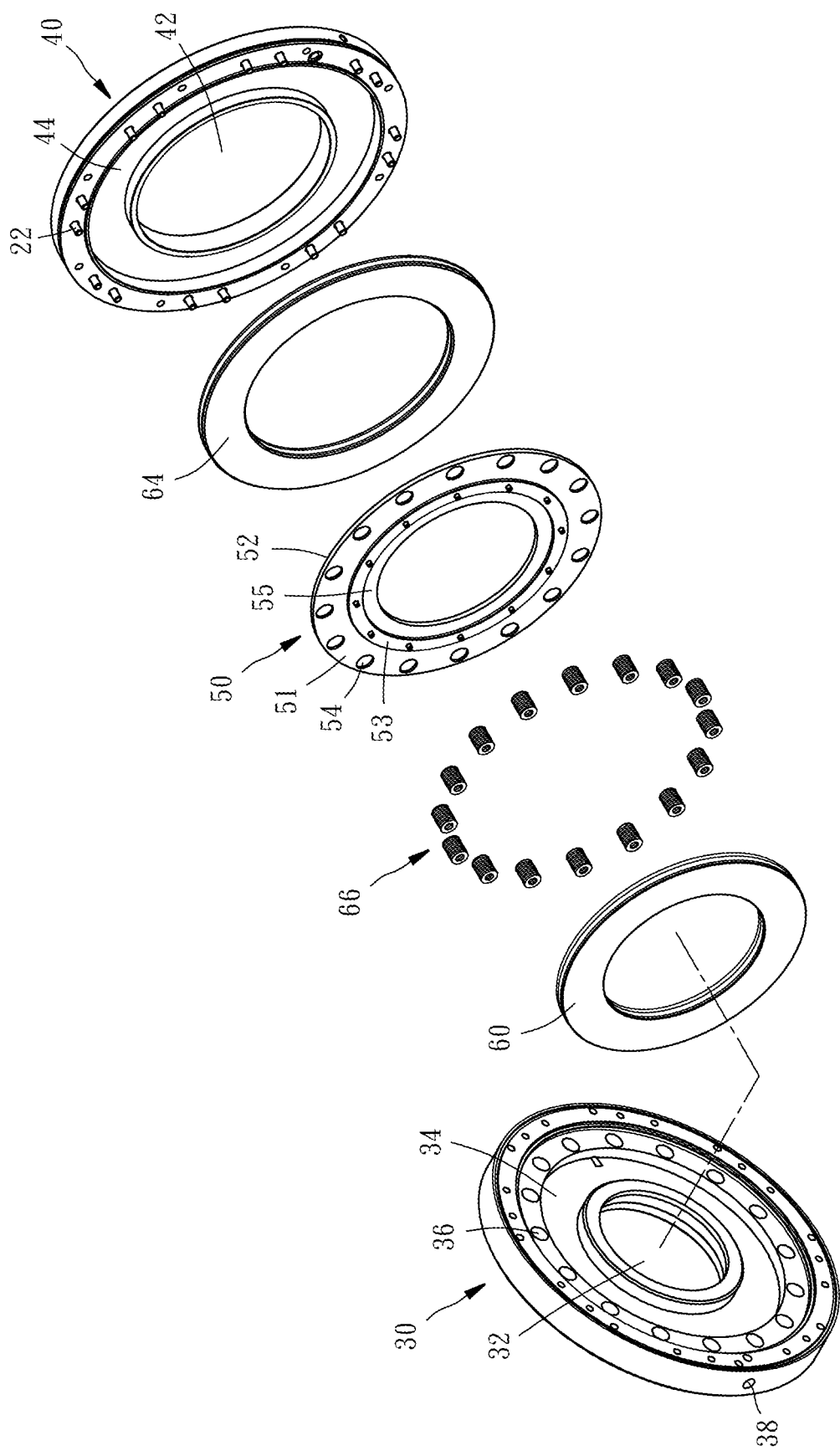
FIG. 2 is an exploded perspective view of the pushing force-actuated braking device in FIG. 1.

Referring to FIG. 1 and FIG. 2, the pushing force-actuated braking device 10 according to the first embodiment of the present invention includes an annular housing 20, a brake disc 50, a braking piston 60, a brake-releasing piston 64, and a plurality of braking elements 66.

Figure 3:
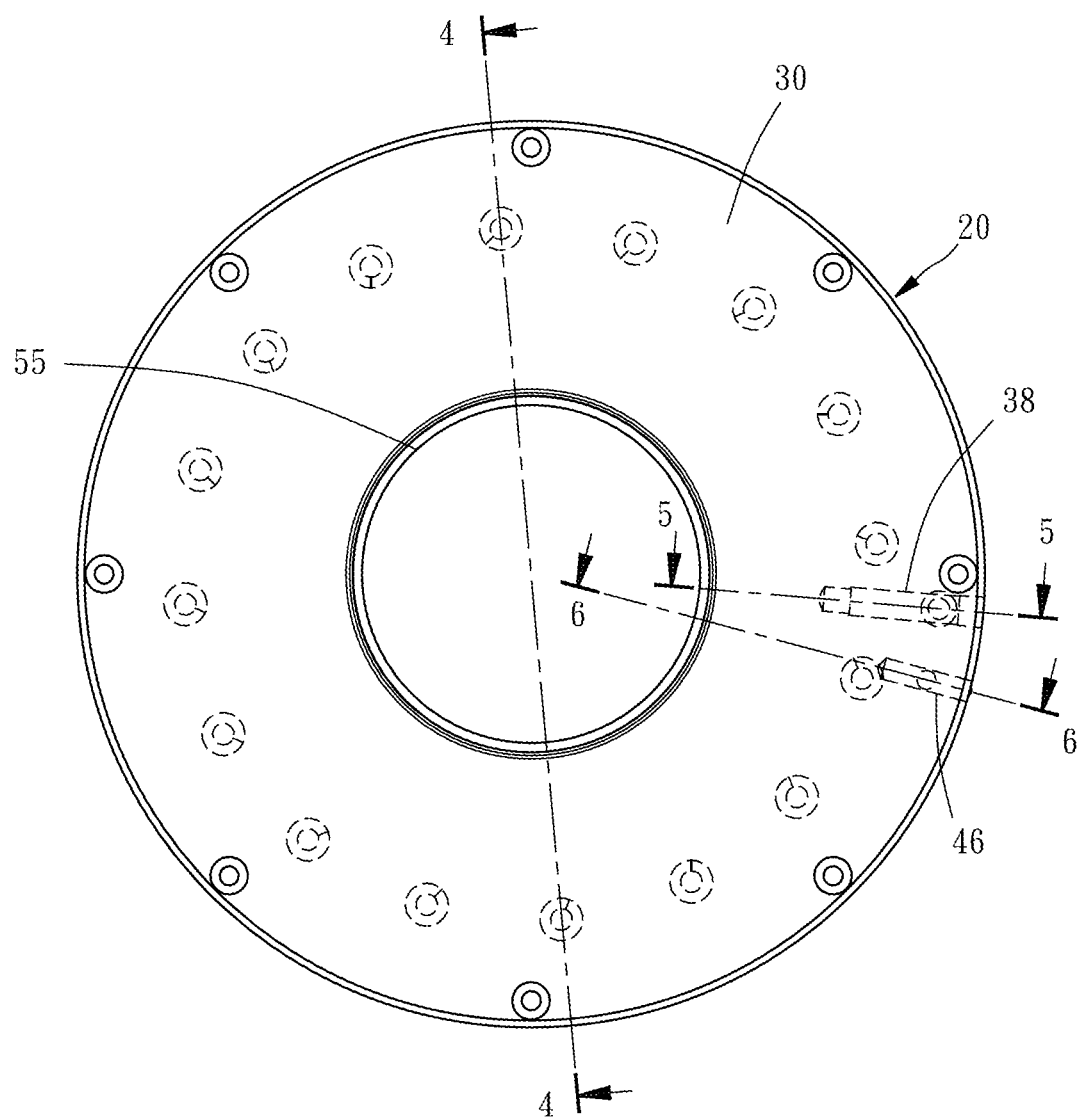
FIG. 3 is an end view of the pushing force-actuated braking device in FIG. 1.
Figure 5:
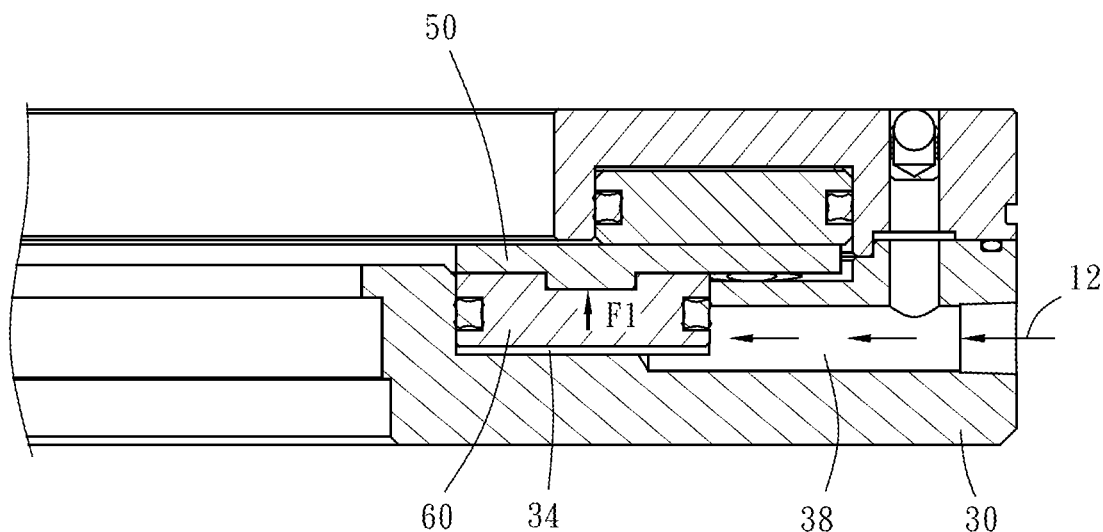
FIG. 5 is a sectional view taken along line 5-5 in FIG. 3.
Figure 6:
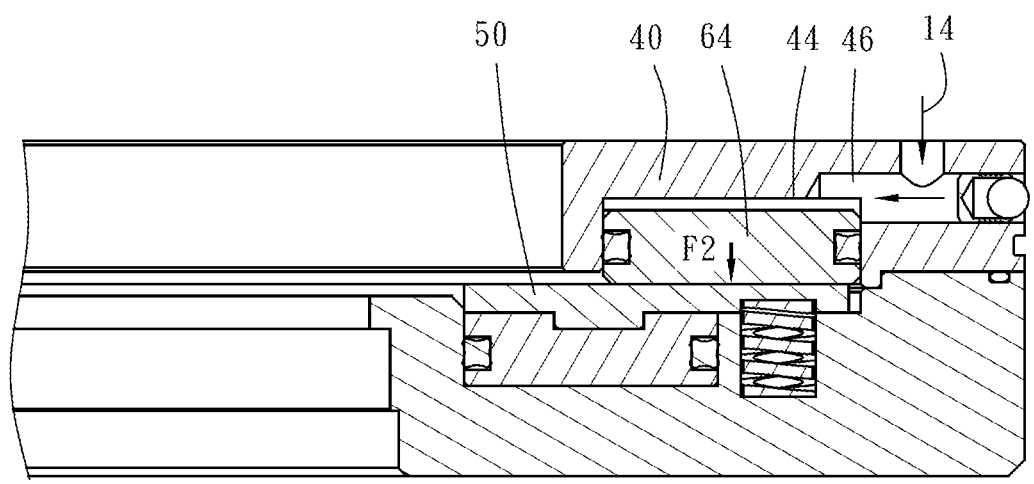
FIG. 6 is a sectional view taken along line 6-6 in FIG. 3.

The annular housing 20 has a first housing portion 30 and a second housing portion 40. The first housing portion 30 and the second housing portion 40 are locked together by a plurality of screws 22. The first housing portion 30 is penetrated by a first axial hole 32 that opens on the inner and outer sides of the first housing portion 30. As shown in FIG. 2 and FIG. 3, the inner side of the first housing portion 30 (i.e., the side facing the second housing portion 40) has a first annular groove 34 surrounding the first axial hole 32 and a plurality of first receiving holes 36 (such as but not limited to the 16 first receiving holes 36 illustrated herein) surrounding the first annular groove 34. The second housing portion 40 is penetrated by a second axial hole 42 that opens on the inner and outer sides of the second housing portion 40. The second axial hole 42 is in communication with the first axial hole 32 and has a larger diameter than the first axial hole 32. The inner side of the second housing portion 40 (i.e., the side facing the first housing portion 30) has a second annular groove 44 surrounding the second axial hole 42. The outer periphery of the first housing portion 30 has a first fluid input hole 38 in communication with the first annular groove 34 as shown in FIG. 2 and FIG. 5, and the outer periphery of the second housing portion 40 has a second fluid input hole 46 in communication with the second annular groove 44 as shown in FIG. 2 and FIG. 6.

The brake disc 50 is provided between the first housing portion 30 and the second housing portion 40 and has a first surface 51 facing the first housing portion 30 and a second surface 52 facing the second housing portion 40. The first surface 51 has an annular positioning protruding portion 53 and a plurality of second receiving holes 54 (such as but not limited to the 16 second receiving holes 54 illustrated herein) surrounding the positioning protruding portion 53. The inner periphery of the brake disc 50 has a braking portion 55. The braking portion 55 of the brake disc 50 extends beyond the periphery of the second axial hole 42 along the radial direction of the second axial hole 42 (see FIG. 4).

The braking piston 60 is fitted in the first annular groove 34 of the first housing portion 30 and abutted against the first surface 51 of the brake disc 50. When a first fluid 12 (e.g., a gas or liquid) is introduced into the first fluid input hole 38, referring to FIG. 5, the braking piston 60 is subjected to the action of the first fluid 12 and in turn applies a first axial pushing force F1 to the brake disc 50. The inner side of the braking piston 60 (i.e., the side facing the brake disc 50) has a positioning recessed portion 62. The positioning recessed portion 62 of the braking piston 60 is fitted over the positioning protruding portion 53 of the brake disc 50 to maintain the relative positions of the braking piston 60 and the brake disc 50.

The brake-releasing piston 64 is fitted in the second annular groove 44 of the second housing portion 40 and is adjacent to the second surface 52 of the brake disc 50. When a second fluid 14 (e.g., a gas or liquid) is introduced into the second fluid input hole 46, referring to FIG. 6, the brake-releasing piston 64 is subjected to the action of the second fluid 14 and in turn applies a second axial pushing force F2 to the brake disc 50.

Figure 4:
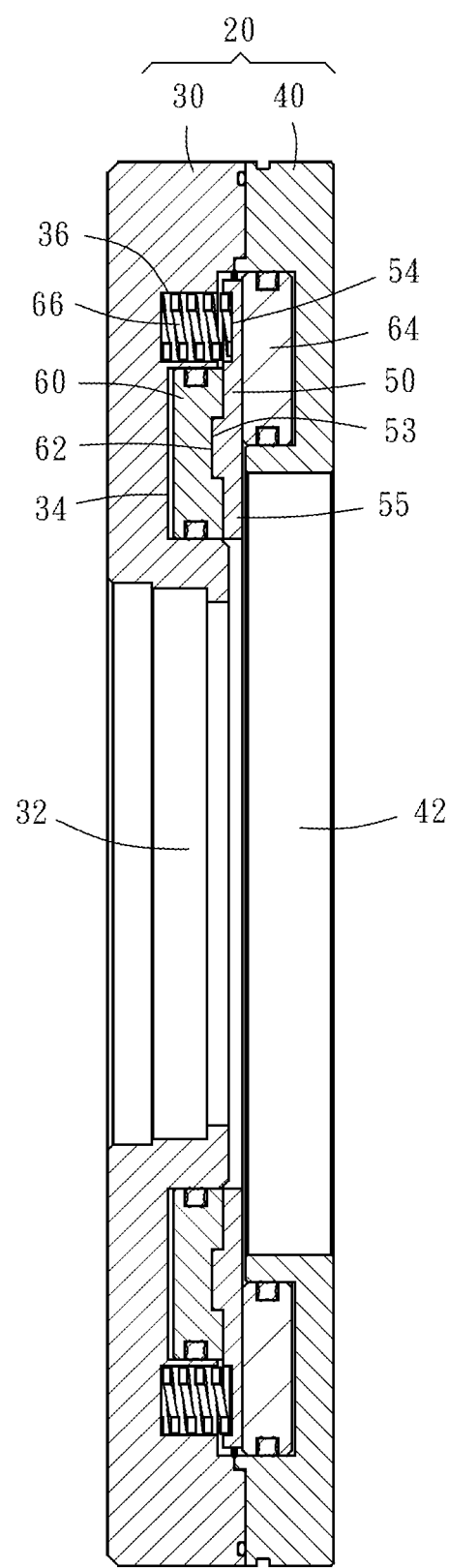
FIG. 4 is a sectional view taken along line 4-4 in FIG. 3.

The braking elements 66 in this embodiment are compression springs. The braking elements 66 are provided between the first receiving holes 36 and the second receiving holes 54 in a one-to-one manner as shown in FIG. 2 and FIG. 4. Each braking element 66 has one end pressing against the end wall of the corresponding first receiving hole 36 and the opposite end pressing against the end wall of the corresponding second receiving hole 54 such that the braking elements 66 constantly apply an elastic force, defined herein as a third axial pushing force F3, to the brake disc 50.

Figure 7:
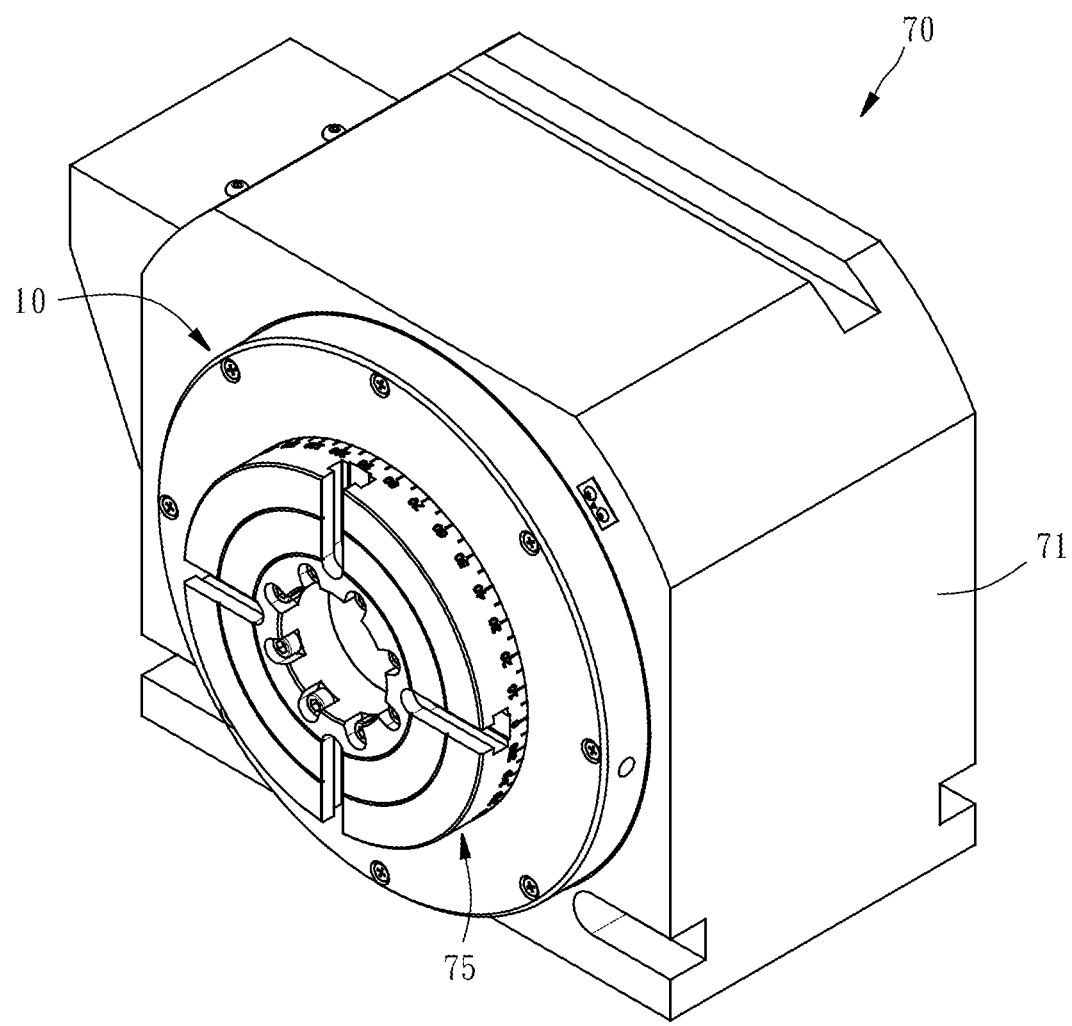
FIG. 7 is a perspective view of a rotary table using the pushing force-actuated braking device according to the first embodiment of the invention.
Figure 8:
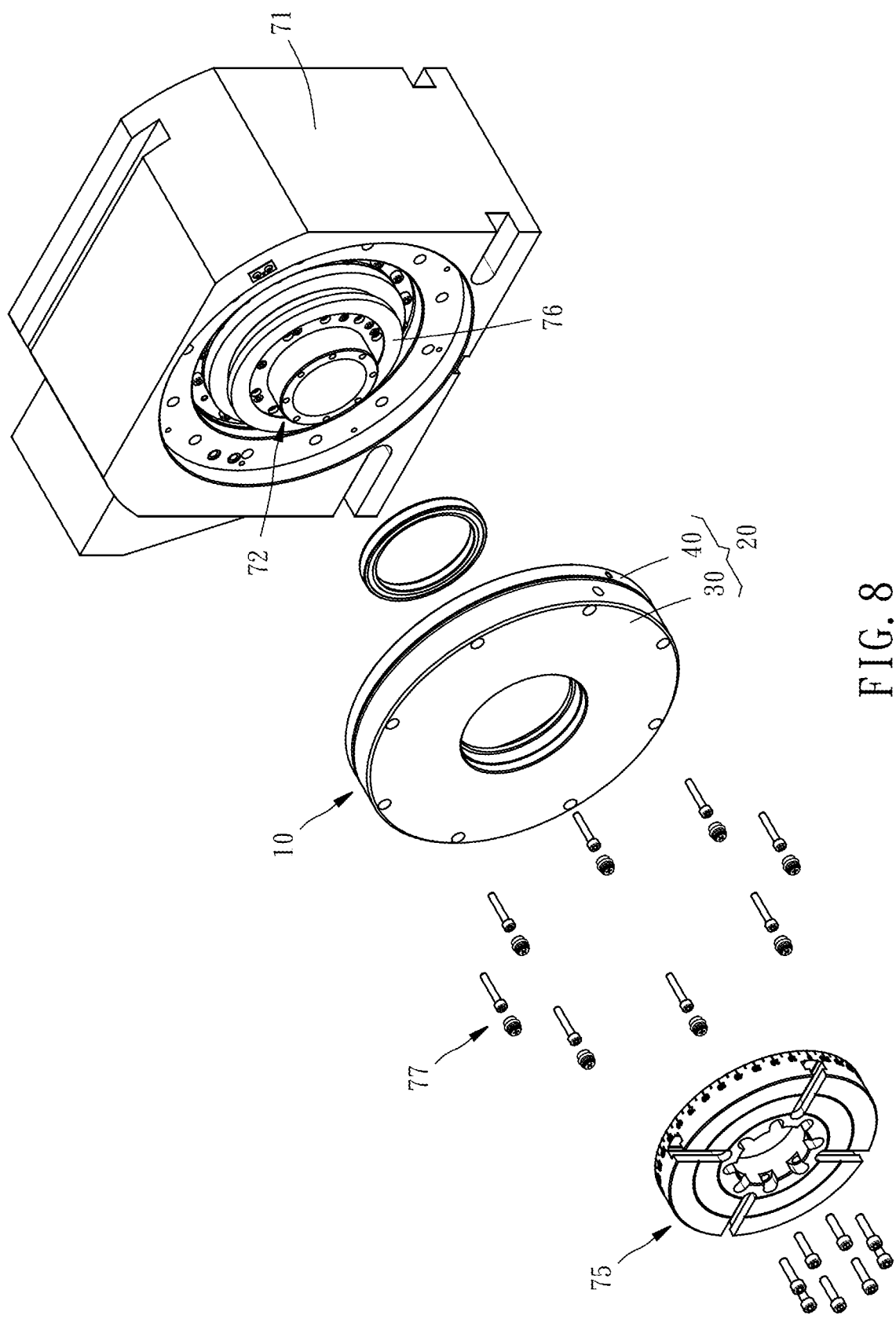
FIG. 8 is a partially exploded perspective view of the rotary table in FIG. 7.

Referring to FIG. 7 and FIG. 8, the rotary table 70 includes a case 71, a rotating shaft 72, and a working disc 75.

The rotating shaft 72 extends through the case 71 in a rotatable manner. The front end of the rotating shaft 72 is connected to the working disc 75 so that when driven by a power source (e.g., a motor) provided in the case 71, the rotating shaft 72 can rotate the working disc 75 together with a to-be-machined workpiece (not shown) fixed on the working disc 75, thereby allowing the workpiece to be machined. In addition, as shown in FIG. 9 and FIG. 10, the front end of the rotating shaft 72 has a protruding annular portion 74, and a braking plate 76 configured to couple with the brake disc 50 is locked to the protruding annular portion 74 of the rotating shaft 72.

To apply the pushing force-actuated braking device 10 of the present invention to the rotary table 70, the first step is to detach the working disc 75 from the rotating shaft 72. Following that, the annular housing 20 is mounted around the front end of the rotating shaft 72 and is locked to the case 71 with a plurality of screws 77. Lastly, the working disc 75 is mounted back in place to complete the mounting process of the pushing force-actuated braking device 10.

To operate the rotary table 70, the first fluid 12 is introduced into the first fluid input hole 38 (see FIG. 5) such that the braking piston 60 is subjected to the action of the first fluid 12 and in turn applies the first axial pushing force F1 to the brake disc 50. During the process, the braking elements 66 constantly apply their elastic force, i.e., the third axial pushing force F3, to the brake disc 50. As a result, the brake disc 50 is kept at a braking position P1 jointly by the first axial pushing force F1 applied by the braking piston 60 to the brake disc 50 and the third axial pushing force F3 applied by the braking elements 66 to the brake disc 50 as shown in FIG. 9, with the braking portion 55 of the brake disc 50 pushed against the braking plate 76. Now that the braking plate 76 and the protruding annular portion 74 of the rotating shaft 72 are fixed together, a braking effect is produced on the rotating shaft 72.

Figure 9:
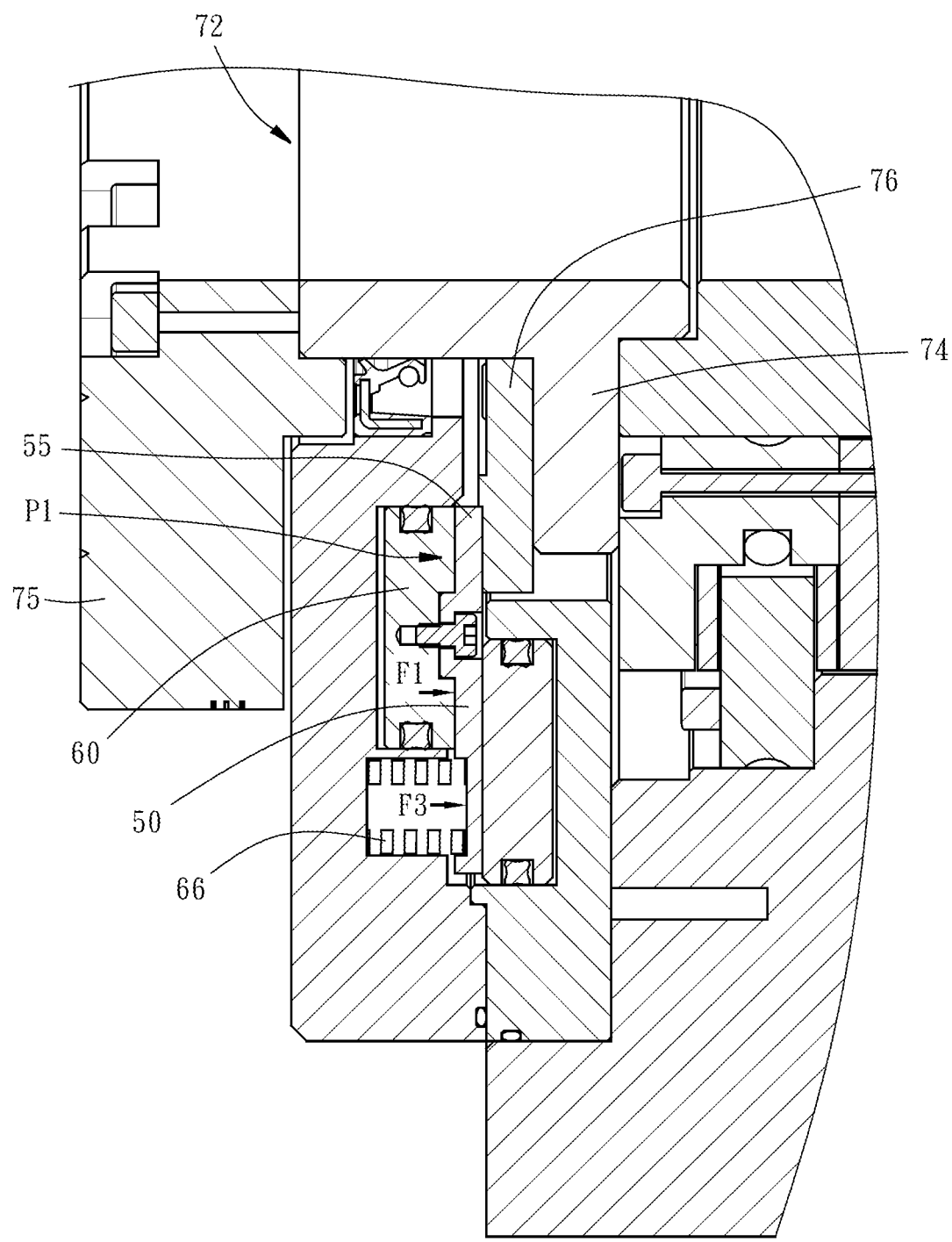
FIG. 9 is a partial sectional view of the rotary table in FIG. 7, showing in particular the brake disc at a braking position.
Figure 10:
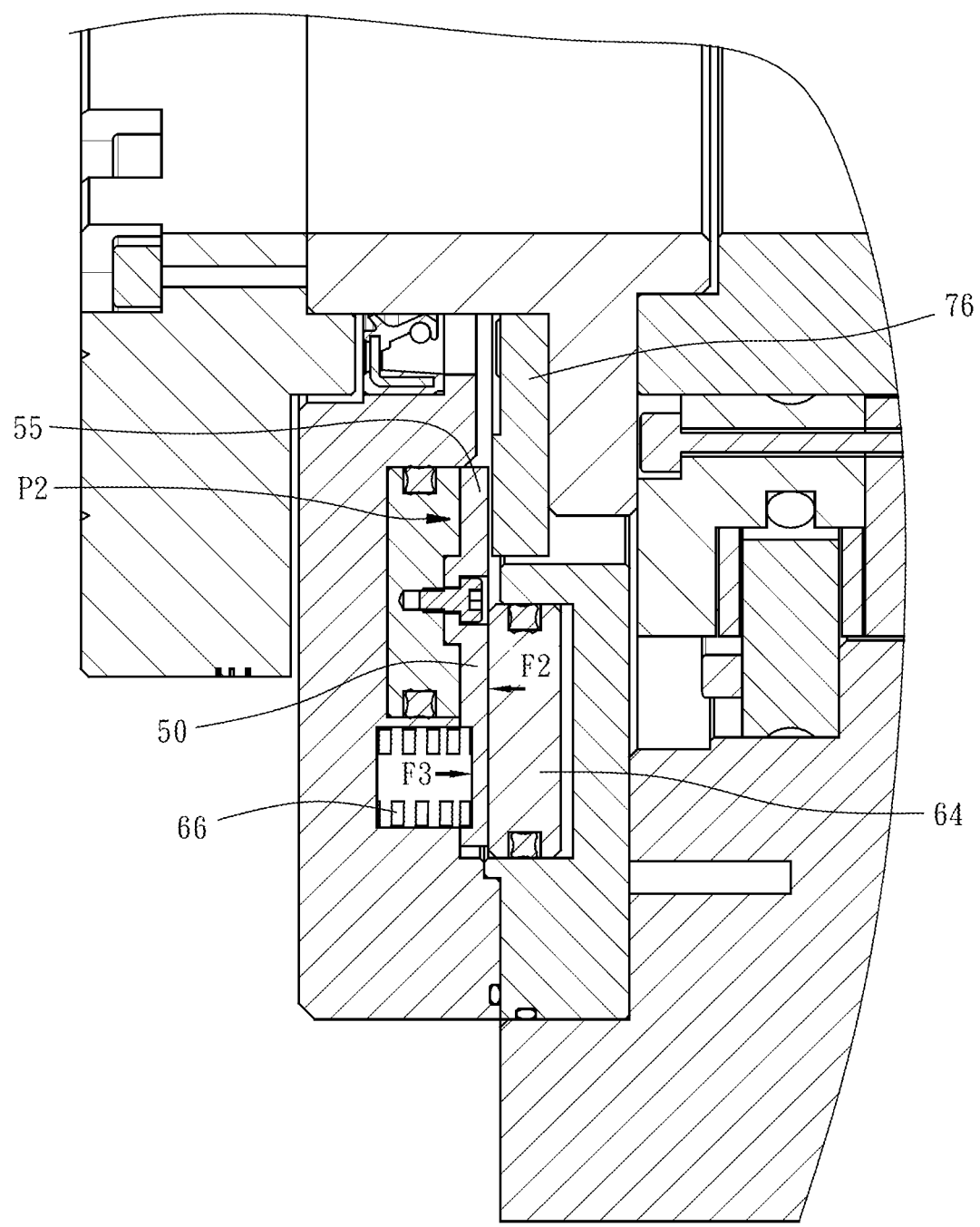
FIG. 10 is similar to FIG. 9 except that the brake disc is at a brake-releasing position.

It is worth mentioning that in order for the brake disc 50 to apply a complete braking force to the rotating shaft 72, the first axial pushing force F1 must be greater than or equal to the third axial pushing force F3 when the brake disc 50 is at the braking position P1 shown in FIG. 9; more specifically, the two pushing forces must satisfy the inequality F3<F1, where: F1=A1×f1, A1 is the area of the braking piston 60 (in the unit of $mm^2$), and f1 is the force applied by the first fluid 12 to the braking piston 60 per unit area (assumed herein to be 0.6 $N/mm^2$).

Conversely, when it is desired to bring the rotating shaft 72 into normal operation, the first step is to stop introducing the first fluid 12 into the first fluid input hole 38 and thereby remove the first axial pushing force F1 applied by the braking piston 60 to the brake disc 50. After that, the second fluid 14 is introduced into the second fluid input hole 46 (see FIG. 6) such that the brake-releasing piston 64 is subjected to the action of the second fluid 14 and in turn applies the second axial pushing force F2 to the brake disc 50. As the braking elements 66 keep applying the third axial pushing force F3 to the brake disc 50, the brake disc 50 will be moved to and eventually kept at a brake-releasing position P2 once the second axial pushing force F2 applied by the brake-releasing piston 64 to the brake disc 50 overcomes the third axial pushing force F3 applied by the braking elements 66 to the brake disc 50 as shown in FIG. 10. When the brake disc 50 is at the brake-releasing position P2, the braking portion 55 of the brake disc 50 and the braking plate 76 are spaced apart and form a gap therebetween to enable normal operation of the rotating shaft 72.

It is worth mentioning that in order to keep the brake disc 50 at the brake-releasing position P2 shown in FIG. 10, the second axial pushing force F2 must be greater than the third axial pushing force F3; more specifically, the two axial pushing forces must satisfy the inequality F3<F2, wherein: F2=A2×f2, A2 is the area of the brake-releasing piston 64 (in the unit of mm²), and f2 is the force applied by the second fluid 14 to the brake-releasing piston 64 per unit area (assumed herein to be 0.6 N/mm²). Given a factor of safety p of 1.2, the foregoing inequality can be rewritten as F3×ρ=F2=A2×f2. By substituting f2=0.6 and p=1.2 into the modified inequality, or equation, the relation $$F3 = \frac{A2}{2}$$

is obtained.

Should the supply of the first fluid 12 and the second fluid 14 fail in special circumstances (e.g., when a power outage takes place without notice or when the corresponding pipes break), the braking piston 60 will be unable to apply the first axial pushing force F1 to the brake disc 50, and yet the brake disc 50 can still be kept at the braking position P1 shown in FIG. 9 by the third axial pushing force F3 applied by the braking elements 66 to ensure that the rotating shaft 72 is safely stopped. In other words, the braking piston 60 will, in normal circumstances, work with the braking elements 66 to apply a complete braking force to the brake disc 50 to keep the brake disc 50 securely at the braking position P1 shown in FIG. 9, but if the braking piston 60 and the brake-releasing piston 64 malfunction, the brake disc 50 can still be kept at the braking position P1 shown in FIG. 9 by a partial braking force provided by the braking elements 66. This normally closed braking mechanism enhances operational safety.

Figure 11:
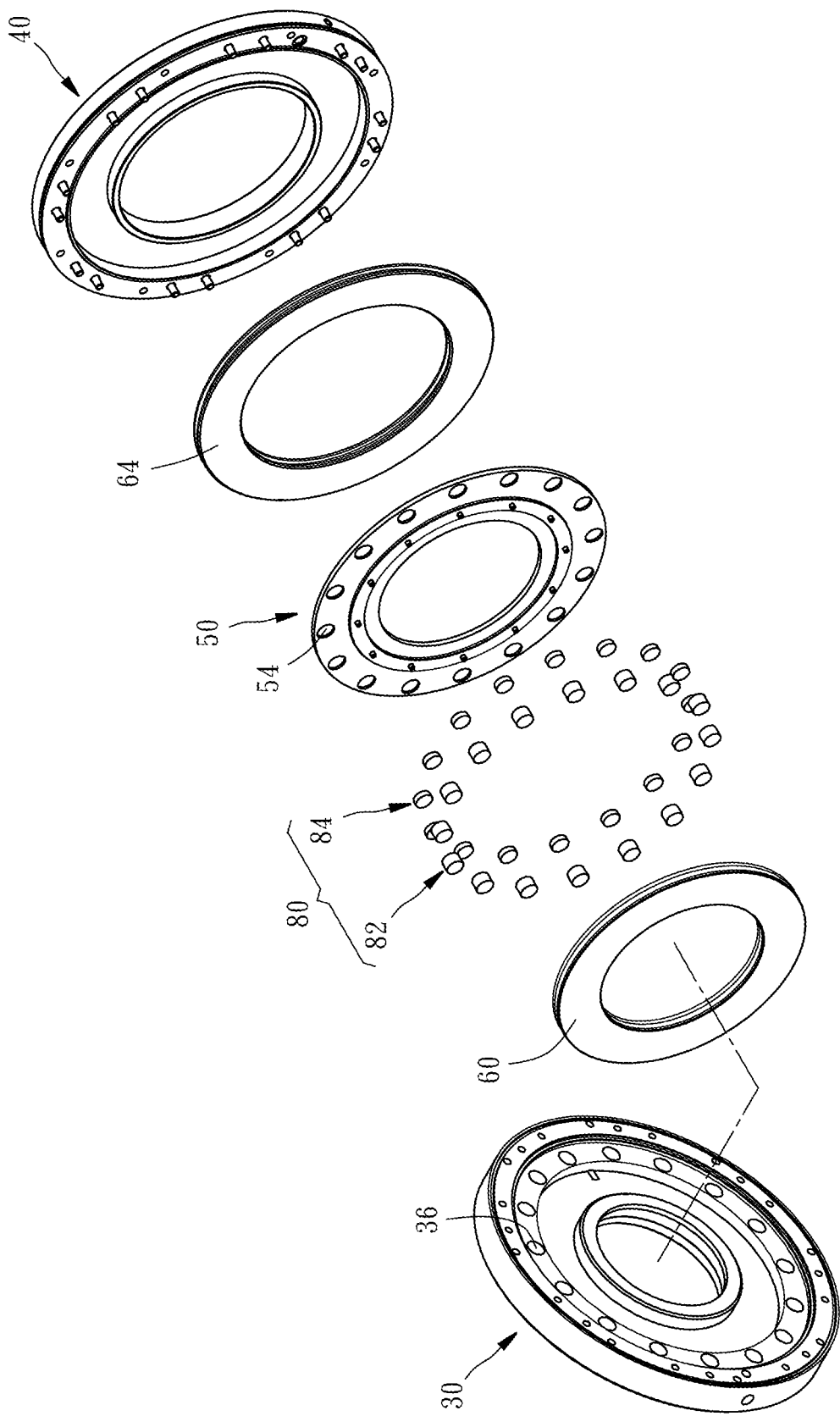
FIG. 11 is an exploded perspective view of the pushing force-actuated braking device according to the second embodiment of the invention.
Figure 12:
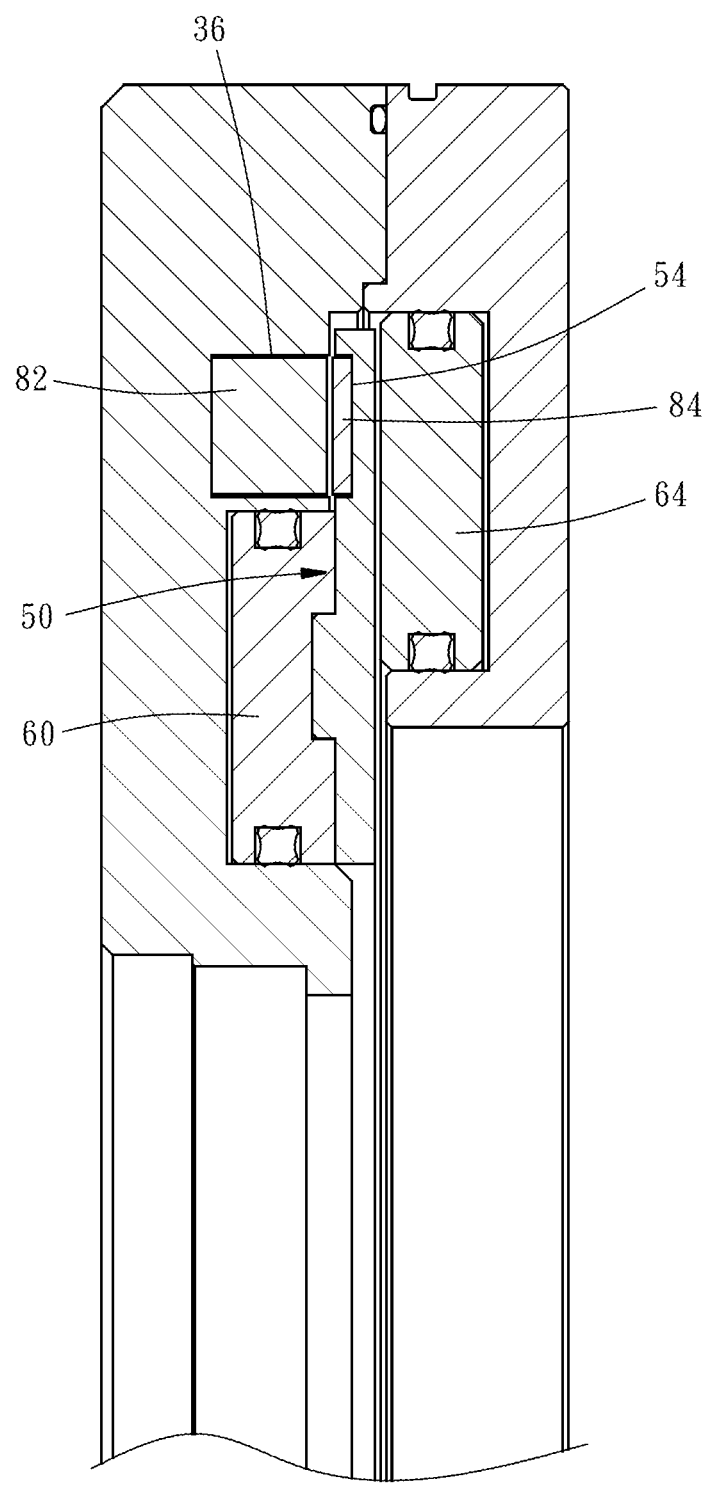
FIG. 12 is a partial sectional view of the pushing force-actuated braking device according to the second embodiment of the invention.

Apart from applying an elastic force as the third axial pushing force F3, the braking elements may alternatively apply a magnetic repulsive force as the third axial pushing force F3. More specifically, referring to FIG. 11 and FIG. 12, each braking element 80 is composed of a first magnet 82 and a second magnet 84. Each first magnet 82 is provided in the corresponding first receiving hole 36 of the first housing portion 30, and each second magnet 84 is provided in the corresponding second receiving hole 54 of the brake disc 50. The corresponding ends of each corresponding pair of first and second magnets 82 and 84 have the same polarities, so each first magnet 82 and second magnet 84 generate a magnetic repulsive force therebetween that constitutes the third axial pushing force.

Figure 13:
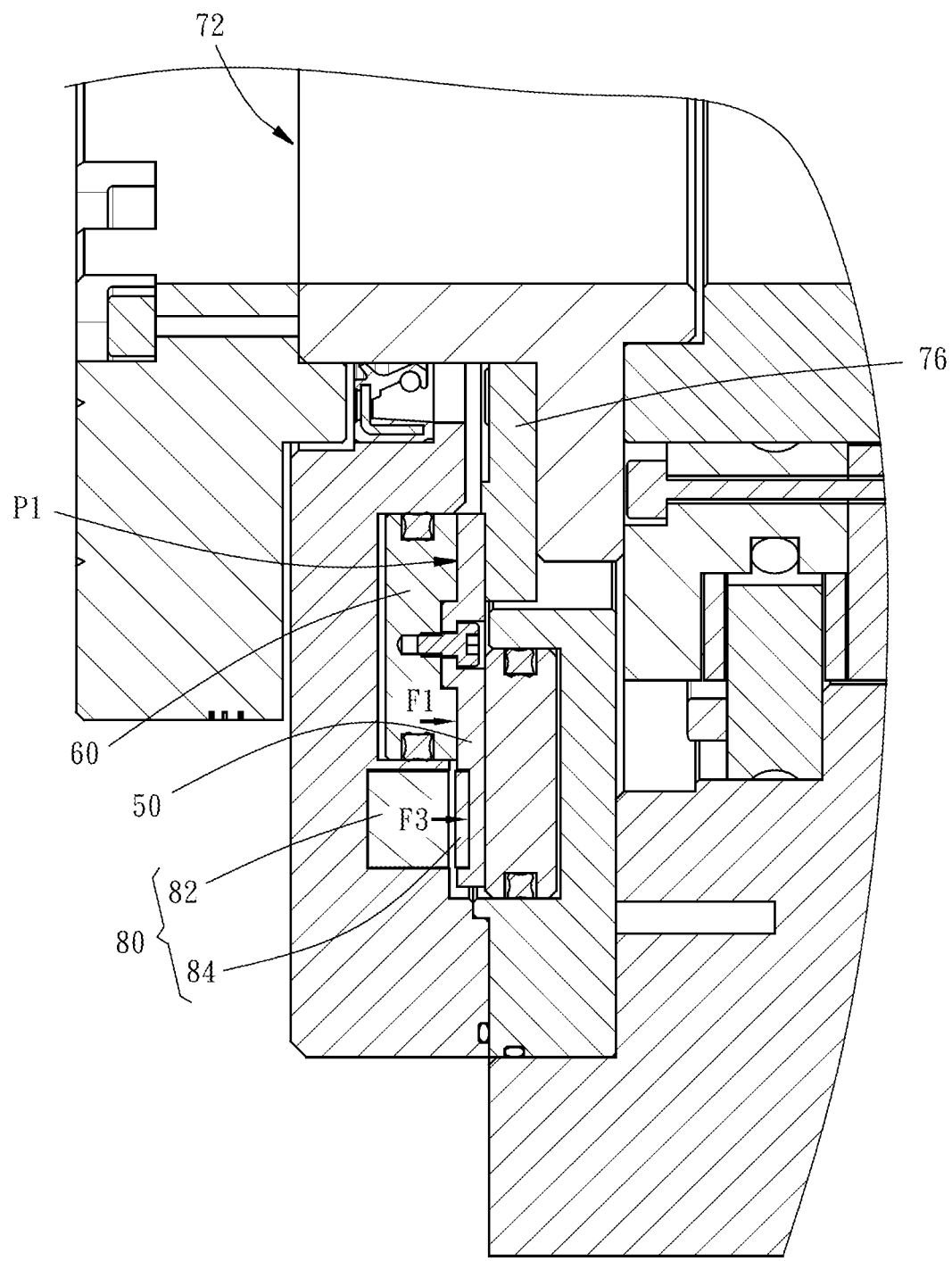
FIG. 13 is a partial sectional view of a rotary table using the pushing force-actuated braking device according to the second embodiment of the invention, showing in particular the brake disc at the braking position.

Referring to FIG. 13, when the first fluid 12 is introduced into the first fluid input hole 38, the brake disc 50 is kept at the braking position P1 jointly by the first axial pushing force F1 applied by the braking piston 60 to the brake disc 50 and the third axial pushing force F3 applied by the braking elements 80 to the brake disc 50. A braking effect is thus produced on the rotating shaft 72 by the brake disc 50.

Figure 14:
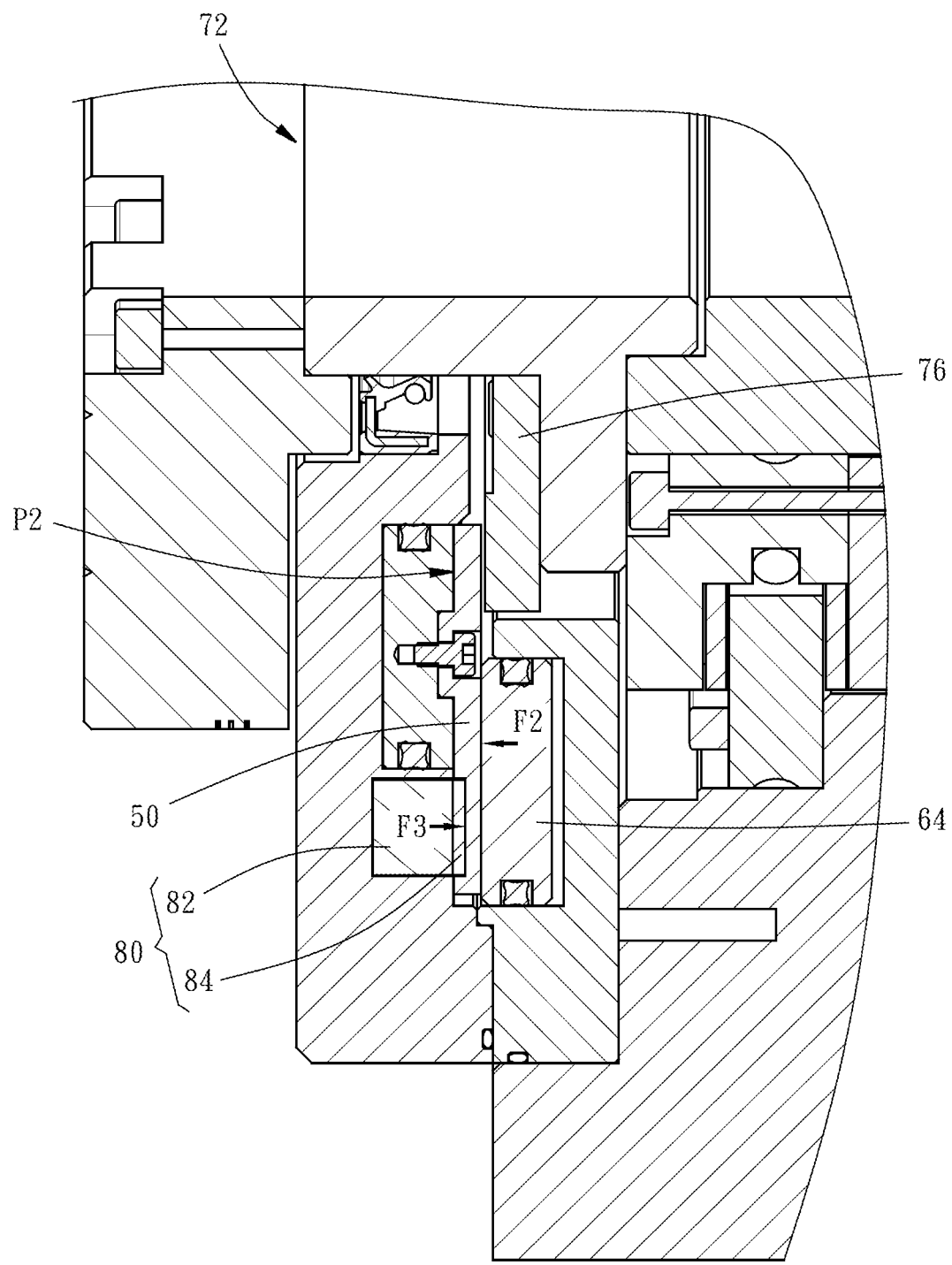
FIG. 14 is similar to FIG. 13 except that the brake disc is at the brake-releasing position.

Conversely, when it is desired to bring the rotating shaft 72 into normal operation, the first step is to stop introducing the first fluid 12 into the first fluid input hole 38 and thereby remove the first axial pushing force F1 applied by the braking piston 60 to the brake disc 50. After that, the second fluid 14 is introduced into the second fluid input hole 46 such that the brake-releasing piston 64 is subjected to the action of the second fluid 14 and in turn applies the second axial pushing force F2 to the brake disc 50. As the braking elements 80 keep applying the third axial pushing force F3 to the brake disc 50, the brake disc 50 will be moved to and eventually kept at the brake-releasing position P2 once the second axial pushing force F2 applied by the brake-releasing piston 64 to the brake disc 50 overcomes the third axial pushing force F3 applied by the braking elements 80 to the brake disc 50 as shown in FIG. 14, thereby enabling normal operation of the rotating shaft 72.

Should the supply of the first fluid 12 and the second fluid 14 fail in special circumstances (e.g., when a power outage takes place without notice or when the corresponding pipes break), the brake disc 50 can still be kept at the braking position P1 shown in FIG. 13 by the third axial pushing force F3 applied by the braking elements 80, and a normally closed braking mechanism is thus achieved.

Figure 15:
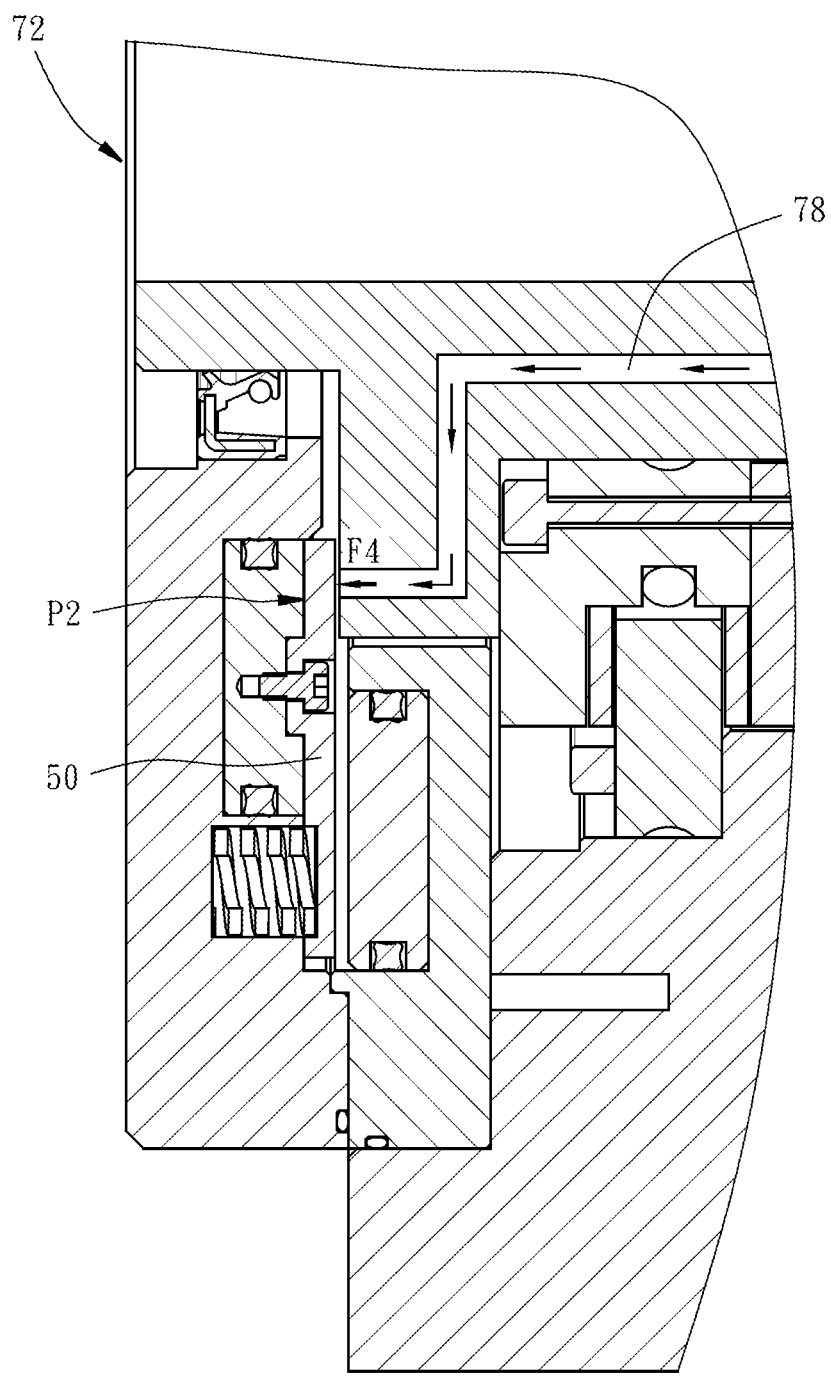
FIG. 15 is a partial sectional view of a rotary table using the pushing force-actuated braking device according to the first embodiment of the invention, showing in particular a gas applying a fourth axial pushing force to the brake disc.

It is worth mentioning that regardless of whether the braking elements 66 or 80 are used, a fourth axial pushing force F4 can be applied to the brake disc 50 in the course of mounting the pushing force-actuated braking device 10 to the case 71 as shown in FIG. 15, in order to keep the brake disc 50 at the brake-releasing position P2 until the mounting process is completed, thereby protecting the contact surfaces of the brake disc 50 and of the rotating shaft 72 from damage by collision between the contact surfaces. The fourth axial pushing force F4 may be provided by the brake-releasing piston 64 or, as shown in FIG. 15, by forming a gas channel 78 in the rotating shaft 72 and injecting a gas into the gas channel 78 in order for the gas to form a gas curtain between the contact surfaces and thereby provide the fourth axial pushing force F4.

According to the above, the braking piston 60 and the brake-releasing piston 64 of the pushing force-actuated braking device 10 of the present invention are so designed that simply by guiding the first fluid 12 to the braking piston 60 and the second fluid 14 to the brake-releasing piston 64, the brake disc 50 will be driven to produce a braking effect and a brake-releasing effect effectively. If the braking piston 60 fails, the braking elements 66 or 80 will still apply a partial braking force to the brake disc 50 to keep the brake disc 50 at the braking position P1; thus, a normally closed braking mechanism is provided to enhance operational safety. Moreover, the pushing force-actuated braking device 10 of the invention has a modular design, need not be fixed to the rotating shaft 72 when applied to the rotary table 70, and therefore provides convenience of assembly. The pushing force-actuated braking device 10 of the invention can also be easily detached from the case 71 in order to be adjusted or serviced.

What is claimed is:

1. A pushing force-actuated braking device, comprising:
   an annular housing;
   a brake disc provided in the annular housing and movable between a braking position and a brake-releasing position, wherein the brake disc has a first surface and a second surface facing away from the first surface;
   a braking piston provided in the annular housing and abutted against the first surface of the brake disc, wherein the braking piston is configured to apply a first axial pushing force to the brake disc when subjected to an action of a first fluid;
   a brake-releasing piston provided in the annular housing and adjacent to the second surface of the brake disc, wherein the brake-releasing piston is configured to apply a second axial pushing force to the brake disc when subjected to an action of a second fluid; and
   a plurality of braking elements provided in the annular housing and located on a same side of the brake disc as the braking piston, wherein the braking elements are configured to apply a third axial pushing force to the brake disc constantly;
wherein when the braking piston is not subjected to the action of the first fluid, and the brake-releasing piston is not subjected to the action of the second fluid either, the brake disc is kept at the braking position by the third axial pushing force applied by the braking elements to the brake disc; when the braking piston is subjected to the action of the first fluid, but the brake-releasing piston is not subjected to the action of the second fluid, the brake disc is kept at the braking position jointly by the first axial pushing force applied by the braking piston to the brake disc and the third axial pushing force applied by the braking elements to the brake disc; and when the braking piston is not subjected to the action of the first fluid, but the brake-releasing piston is subjected to the action of the second fluid, the second axial pushing force applied by the brake-releasing piston to the brake disc overcomes the third axial pushing force applied by the braking elements to the brake disc and thereby keeps the brake disc at the brake-releasing position;
wherein the annular housing has a first housing portion and a second housing portion provided at the first housing portion; the braking piston and the braking elements are provided in the first housing portion, the brake-releasing piston is provided in the second housing portion, and the brake disc is provided between the first housing portion and the second housing portion;
wherein the first housing portion has a side facing the second housing portion and having a first annular groove equipped with the braking piston; the first housing portion has an outer periphery having a first fluid input hole in communication with the first annular groove; the second housing portion has a side facing the first housing portion and having a second annular groove equipped with the brake-releasing piston; the second housing portion has an outer periphery having a second fluid input hole in communication with the second annular groove;
wherein the side of the first housing portion that faces the second housing portion further has a plurality of first receiving holes surrounding the first annular groove; the first surface of the brake disc has a plurality of second receiving holes; each said braking element is a compression spring and is received in a corresponding one of the first receiving holes, and each said braking element has one end pressing against an end wall of the corresponding first receiving hole and an opposite end abutted against an end wall of a corresponding one of the second receiving holes and thus generates an elastic force constituting the third axial pushing force.

2. The pushing force-actuated braking device of claim 1, wherein the side of the first housing portion that faces the second housing portion further has a plurality of first receiving holes surrounding the first annular groove; the first surface of the brake disc has a plurality of second receiving holes; each said braking element has a first magnet provided in a corresponding one of the first receiving holes and a second magnet provided in a corresponding one of the second receiving holes; each said first magnet and second magnet have corresponding ends having the same polarities such that each said first magnet and second magnet generate therebetween a magnetic repulsive force constituting the third axial pushing force.

3. A rotary table, comprising:
a case;
a rotating shaft extending through the case in a rotatable manner, wherein the rotating shaft has an outer peripheral surface having a protruding annular portion;
a working disc connected to a front end of the rotating shaft and hence simultaneously rotatable with the rotating shaft; and
the pushing force-actuated braking device of claim 1, wherein the annular housing is provided at the case and is penetrated by the front end of the rotating shaft, the brake disc is pushed against the protruding annular portion of the rotating shaft when at the braking position, and the brake disc and the protruding annular portion of the rotating shaft are spaced apart and form a gap therebetween when the brake disc is at the brake-releasing position.

4. The rotary table of claim 3, wherein a braking plate is locked to the protruding annular portion of the rotating shaft; the brake disc has an inner periphery having a braking portion, and the braking portion of the brake disc is pushed against the braking plate when the brake disc is at the braking position.

5. The rotary table of claim 3, wherein the brake disc is subjected to a fourth axial pushing force and thereby kept at the brake-releasing position while the annular housing is being mounted to the case.

6. The rotary table of claim 5, wherein the rotating shaft is provided therein with a gas channel, and while the annular housing is being mounted to the case, a gas is injected into the gas channel in order for the gas to apply the fourth axial pushing force to the brake disc.

7. The rotary table of claim 3, wherein the first surface of the brake disc has a positioning protruding portion; the braking piston has a side facing the brake disc and having a positioning recessed portion; the positioning protruding portion of the brake disc is fitted in the positioning recessed portion of the braking piston.

8. The rotary table of claim 3, wherein the annular housing has a first housing portion and a second housing portion provided at the first housing portion; the braking piston and the braking elements are provided in the first housing portion, the brake-releasing piston is provided in the second housing portion, and the brake disc is provided between the first housing portion and the second housing portion.

9. The rotary table of claim 8, wherein the first housing portion has a side facing the second housing portion and having a first annular groove equipped with the braking piston; the first housing portion has an outer periphery having a first fluid input hole in communication with the first annular groove; the second housing portion has a side facing the first housing portion and having a second annular groove equipped with the brake-releasing piston; the second housing portion has an outer periphery having a second fluid input hole in communication with the second annular groove.

10. The pushing force-actuated braking device of claim 9, wherein the side of the first housing portion that faces the second housing portion further has a plurality of first receiving holes surrounding the first annular groove; the first surface of the brake disc has a plurality of second receiving holes; each said braking element is a compression spring and is received in a corresponding one of the first receiving holes, and each said braking element has one end pressing against an end wall of the corresponding first receiving hole and an opposite end abutted against an end wall of a corresponding one of the second receiving holes and thus generates an elastic force constituting the third axial pushing force.

11. The pushing force-actuated braking device of claim 9, wherein the side of the first housing portion that faces the second housing portion further has a plurality of first receiving holes surrounding the first annular groove; the first surface of the brake disc has a plurality of second receiving holes; each said braking element has a first magnet provided in a corresponding one of the first receiving holes and a second magnet provided in a corresponding one of the second receiving holes; each said first magnet and second magnet have corresponding ends having the same polarities such that each said first magnet and second magnet generate therebetween a magnetic repulsive force constituting the third axial pushing force.

\* \* \* \* \*